United States Patent
Lu (10) Patent No.: US 12,550,836 B1
(45) Date of Patent: Feb. 17, 2026

(54) GROUND-PLANTED FLOWER BED

(71) Applicant: COSTWAY.COM, INC, Fontana, CA (US)

(72) Inventor: Amber Lu, Fontana, CA (US)

(73) Assignee: COSTWAY.COM, INC, Fontana, CA (US)

( * ) Notice: Subject to any disclaimer, the term of this patent is extended or adjusted under 35 U.S.C. 154(b) by 0 days.

(21) Appl. No.: 19/080,720

(22) Filed: Mar. 14, 2025

(51) Int. Cl.
*A01G 9/28* (2018.01)

(52) U.S. Cl.
CPC ................... *A01G 9/28* (2018.02)

(58) Field of Classification Search
CPC ........................................... A01G 9/28
See application file for complete search history.

(56) References Cited

U.S. PATENT DOCUMENTS

| | | | | |
|---|---|---|---|---|
| 1,843,108 A * | 2/1932 | Clayden | ............. | A01G 9/28 47/33 |
| 2,809,809 A * | 10/1957 | Johnston | ............. | A01G 9/28 D8/1 |
| 2,821,809 A * | 2/1958 | Collien | ............. | A01G 9/28 47/33 |
| 3,315,752 A * | 4/1967 | Pasquini | ............. | A01G 9/28 47/33 |
| 3,495,352 A * | 2/1970 | Sbare | ............. | A01G 9/28 47/33 |
| 3,562,993 A * | 2/1971 | Humble et al. | ............. | A01G 9/28 52/169.1 |
| 5,414,956 A * | 5/1995 | Kheradpir | ............. | A01G 9/28 47/33 |
| 6,026,610 A * | 2/2000 | Northrop | ............. | A01G 9/28 47/33 |
| 6,354,038 B1 * | 3/2002 | Morris | ............. | A01G 9/28 47/33 |
| 6,625,925 B1 * | 9/2003 | Foster | ............. | A01G 9/28 47/33 |
| 8,528,249 B1 * | 9/2013 | Kao | ............. | A01G 9/28 47/33 |
| 9,232,698 B1 * | 1/2016 | Williams | ............. | A01G 9/28 |
| 2003/0024157 A1 * | 2/2003 | Conde | ............. | A01G 9/28 47/33 |

(Continued)

FOREIGN PATENT DOCUMENTS

| | | | | |
|---|---|---|---|---|
| JP | H0633436 U | * | 5/1994 | |
| KR | 102277077 B1 | * | 7/2021 | ........... E01C 11/221 |

*Primary Examiner* — Monica L Perry
*Assistant Examiner* — Aaron M Rodziwicz (57) ABSTRACT

A ground-planted flower bed includes multiple support plates connected end-to-end, and a splicing mechanism set between adjacent support plates. The support plates include adjacent first support plate and second support plate. The splicing mechanism includes an insert plate set on a front end of the first support plate, an insertion slot set on a rear end of the second support plate for receiving the insert plate, a slot set on the insert plate, a clamping portion corresponding to the slot set on the second support plate, the clamping portion being configurable into an unfolded state having a straight configuration, and a folded state having a bent configuration that protrudes outward from one side of the second support plate, and a limiting plate formed on the rear end of the second support plate, the limiting plate being offset to the same side of the second support plate.

17 Claims, 8 Drawing Sheets

(56) References Cited

U.S. PATENT DOCUMENTS

| | | | | |
|---|---|---|---|---|
| 2006/0150479 A1* | 7/2006 | Saunders | ................ | F21V 21/34 47/33 |
| 2006/0150480 A1* | 7/2006 | Ruller | ...................... | A01G 9/28 47/33 |
| 2012/0311927 A1* | 12/2012 | Bolin | ...................... | A01G 9/28 47/33 |
| 2018/0228102 A1* | 8/2018 | Centeno | ................... | A01G 9/28 |
| 2022/0095551 A1* | 3/2022 | Merani | ................... | A01G 9/28 |

\* cited by examiner

GROUND-PLANTED FLOWER BED

TECHNICAL FIELD

This disclosure relates to the field of flower cultivation technology, specifically, it relates to a ground-planted flower bed.

BACKGROUND ART

Flower cultivation, in simple terms, refers to the process of planting flower seeds, seedlings, or mature plants in suitable soil or substrate through a series of cultivation management measures to promote their growth, flowering, and reproduction. This process covers the entire process from seed selection, sowing, seedling cultivation, transplanting, daily management to final viewing or harvesting. Currently, flower beds are often used in the process of flower cultivation.

Some existing flower beds have complex structures with numerous parts, requiring assembly with fasteners and installation tools. This assembly process is troublesome, time-consuming, and has high production costs. It is difficult for users to assemble on their own, resulting in a poor user experience. The aforementioned flower beds assembled with fasteners are prone to loosening during use, leading to a loose structure of the flower bed, inability to ensure assembly firmness, and even the problem of falling apart, affecting normal use. Furthermore, some existing flower beds include multiple interconnected support plates. To facilitate assembly, the support plates are generally straight, and the assembly structure between support plates is either straight or corner-joined, making it impossible to connect curved support plates. This limits the range of applications for the assembly structure.

SUMMARY OF THE DISCLOSURE

To solve at least one aspect of the above problems, this disclosure provides a ground-planted flower bed, including: multiple support plates, these multiple support plates are connected end-to-end in sequence to form a circular shape, with a splicing mechanism set between adjacent support plates. The support plates include adjacent first support plate and second support plate, connected by the splicing mechanism. The end of the first support plate near the second support plate is the front end, and the end of the second support plate near the first support plate is the rear end. The splicing mechanism includes an insert plate and a corresponding insertion slot for the insert plate. The insert plate is set on the front end, the insertion slot is set on the rear end, a slot is set on the insert plate, and a clamping portion corresponding to the slot is set on the second support plate. This ground-planted flower bed has a simple structure and low production cost; no fasteners are needed for assembly, making assembly operation simple and assembly cost low; the structure is stable after assembly of the support plates, not prone to loosening or falling apart, providing a good user experience; the splicing mechanism is suitable for straight splicing, corner splicing, and curved support plate splicing, with a wide range of applications.

Optionally, the clamping portion is a bendable clamping strip, integrally formed with the second support plate. The clamping portion has an unfolded state when not bent and a folded state when bent. Before the first support plate and the second support plate are connected, the clamping portion is in the unfolded state; when connecting the first support plate and the second support plate, first insert the insert plate into the slot, aligning the unfolded clamping portion with the slot, then bend the unfolded clamping portion into the folded state, so that the folded clamping portion engages with the corresponding slot.

Optionally, a limiting plate is integrally formed on the rear end, the insertion slot is formed between the second support plate and the limiting plate. When the insert plate is inserted into the insertion slot, the limiting plate is placed on one side of the first support plate.

Optionally, a connection portion is integrally connected between the limiting plate and the second support plate. The limiting plate is offset to one side of the second support plate through the connection portion. The clamping portion in its folded state protrudes outward from one side of the second support plate. The limiting plate and the clamping portion in its folded state are on the same side of the second support plate.

Optionally, there are two connection portions arranged vertically, with the insertion slot formed between these two connection portions.

Optionally, the insert plate is integrally connected with the first support plate, and the insert plate can be bent relative to the first support plate. The limiting plate can be bent relative to the second support plate. A strip-shaped through slot is set at the connection portion between the insert plate and the first support plate, which facilitates bending the insert plate at the connection portion.

Optionally, multiple pointed teeth are set at the lower end of the support plate, with these multiple pointed teeth distributed along the extension direction of the support plate.

Optionally, a bending portion is set on the upper part of the support plate.

Optionally, the support plate is a flexible and deformable plate body, which can be straight or curved.

Optionally, the support plate is made of thin metal sheet.

Compared to the prior art, the ground-planted flower bed in this disclosure has a simple structure and low production cost; no fasteners are needed for assembly, making assembly operation simple and assembly cost low; the structure is stable after assembly of the support plates, not prone to loosening or falling apart, providing a good user experience; the splicing mechanism is suitable for straight splicing, corner splicing, and curved support plate splicing, with a wide range of applications; when connecting the first support plate and the second support plate, first insert the insert plate into the corresponding insertion slot, then secure it by engaging the clamping portion with the slot, the structure is simple and operation is convenient; the limiting plate is placed on one side of the first support plate to limit its movement, preventing the front end of the first support plate from easily displacing relative to the rear end of the second support plate, ensuring a stable structure after splicing that is not prone to loosening; the connection portion allows for offset connection between the limiting plate and the second support plate, while also forming the insertion slot, resulting in a simple structure with a rational design; the strip-shaped through slot facilitates bending the insert plate at the connection portion, making bending convenient for achieving corner splicing between support plates; the pointed teeth make it easy to fix the support plates on the ground, simply insert the teeth into the ground when placing, preventing deformation of the support plates after fixing.

List of reference numerals: 1—support plate, 101—pointed tooth, 102—bending portion, 2—first support plate, 21—front end, 211—insert plate, 212—slot, 213—connection portion, 214—strip-shaped through slot, 3—second support plate, 31—rear end, 311—insertion slot, 312—clamping portion, 313—limiting plate, 314—connection portion.

DETAILED DESCRIPTION OF EMBODIMENTS

To make the above objectives, features, and advantages of this disclosure more apparent and easier to understand, the specific embodiments of this disclosure will be described in detail with reference to the accompanying figures.

In the description of this disclosure, it should be understood that terms such as "up" and "down" indicate orientations or positional relationships based on the normal use of the product.

The terms "first" and "second" are used only for descriptive purposes and should not be understood as indicating or implying relative importance or implicitly specifying the number of technical features indicated. Thus, features defined as "first" and "second" may explicitly or implicitly include at least one such feature.

Embodiment 1

Referring to FIGS. 1-7, Embodiment 1 of this disclosure provides a ground-planted flower bed, including: support plates 1, multiple support plates 1 connected end-to-end in sequence to form a circular shape, with flowers able to be planted on the inner side of the circle, and a splicing mechanism set between adjacent support plates 1. The support plates 1 include adjacent first support plate 2 and second support plate 3, connected by the splicing mechanism. The end of the first support plate 2 near the second support plate 3 is the front end 21, and the end of the second support plate 3 near the first support plate 2 is the rear end 31. The splicing mechanism includes an insert plate 211 and a corresponding insertion slot 311 for the insert plate 211. The insert plate 211 is set on the front end 21, the insertion slot 311 is set on the rear end 31, a slot 212 is set on the insert plate 211, and a clamping portion 312 corresponding to the slot 212 is set on the second support plate 3. In this embodiment, there are 2 clamping portions 312 arranged vertically. When connecting the first support plate 2 and the second support plate 3, first insert the insert plate 211 into the corresponding insertion slot 311, then secure it by engaging the clamping portion 312 with the slot 212. The structure is simple and operation is convenient. This ground-planted flower bed has a simple structure and low production cost; no fasteners are needed for assembly, making assembly operation simple and assembly cost low; the structure is stable after assembly of the support plates, not prone to loosening or falling apart, providing a good user experience; the splicing mechanism is suitable for straight splicing, corner splicing, and curved support plate splicing, with a wide range of applications.

Figure 7:
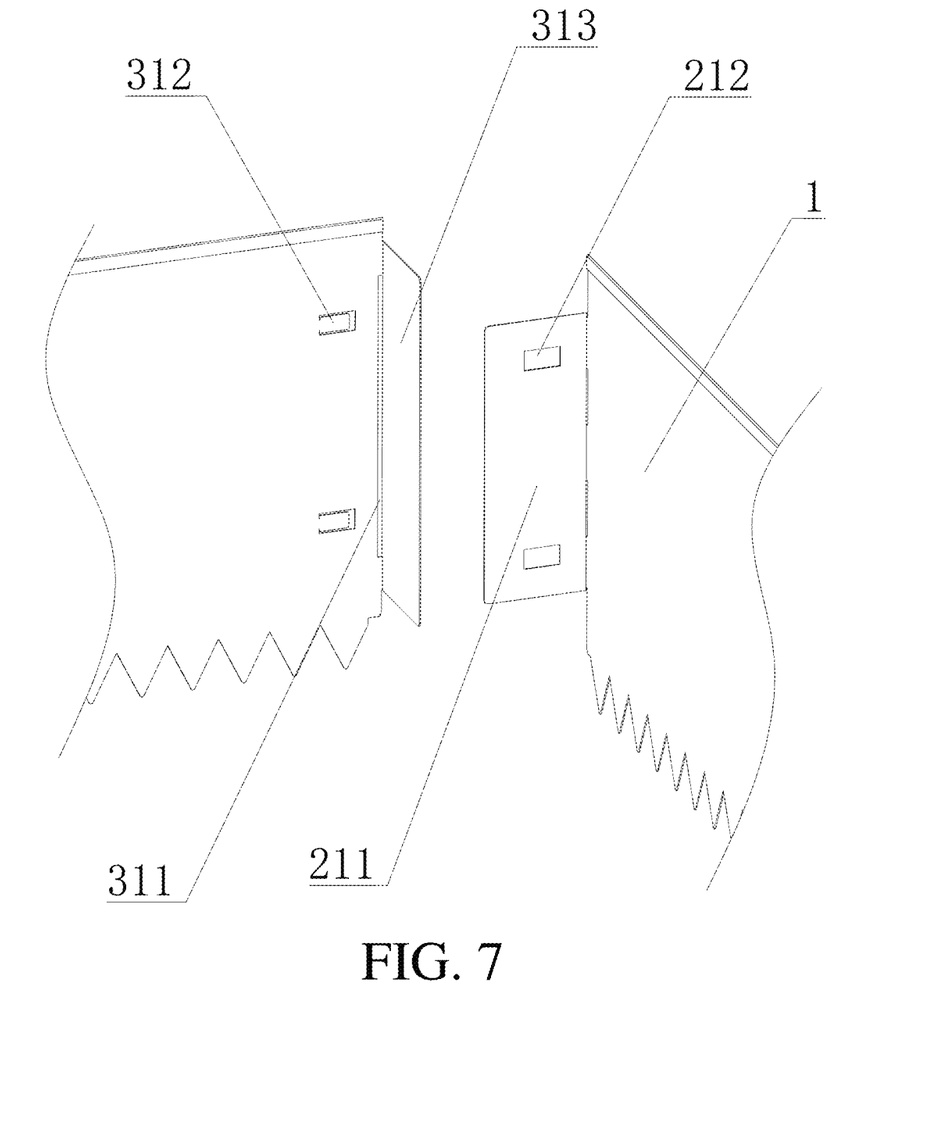
FIG. 7 is a structural diagram of the corner splicing part of the ground-planted flower bed of this disclosure.

Referring to FIGS. 1, 2, 3, and 7, the clamping portion 312 is a bendable clamping strip, integrally formed with the second support plate 3, requiring no additional fasteners for fixing, resulting in a simple structure and easy assembly; the clamping portion 312 has an unfolded state when not bent and a folded state when bent; referring to FIG. 7, before the first support plate 2 and the second support plate 3 are connected, the clamping portion 312 is in the unfolded state; when connecting the first support plate 2 and the second support plate 3, first insert the insert plate 211 into the slot 212, aligning the unfolded clamping portion 312 with the slot 212, then bend the unfolded clamping portion 312 into the folded state, so that the folded clamping portion 312 engages with the corresponding slot 212, completing the splicing between the first support plate and the second support plate; a limiting plate 313 is integrally formed on the rear end 31, the insertion slot 311 is formed between the second support plate 3 and the limiting plate 313, when the insert plate 211 is inserted into the insertion slot 311, the limiting plate 313 is placed on one side of the first support plate 2, limiting the movement of the first support plate 2, preventing the front end 21 of the first support plate 2 from easily displacing relative to the rear end of the second support plate, ensuring a stable structure after splicing that is not prone to loosening.

Figure 3:
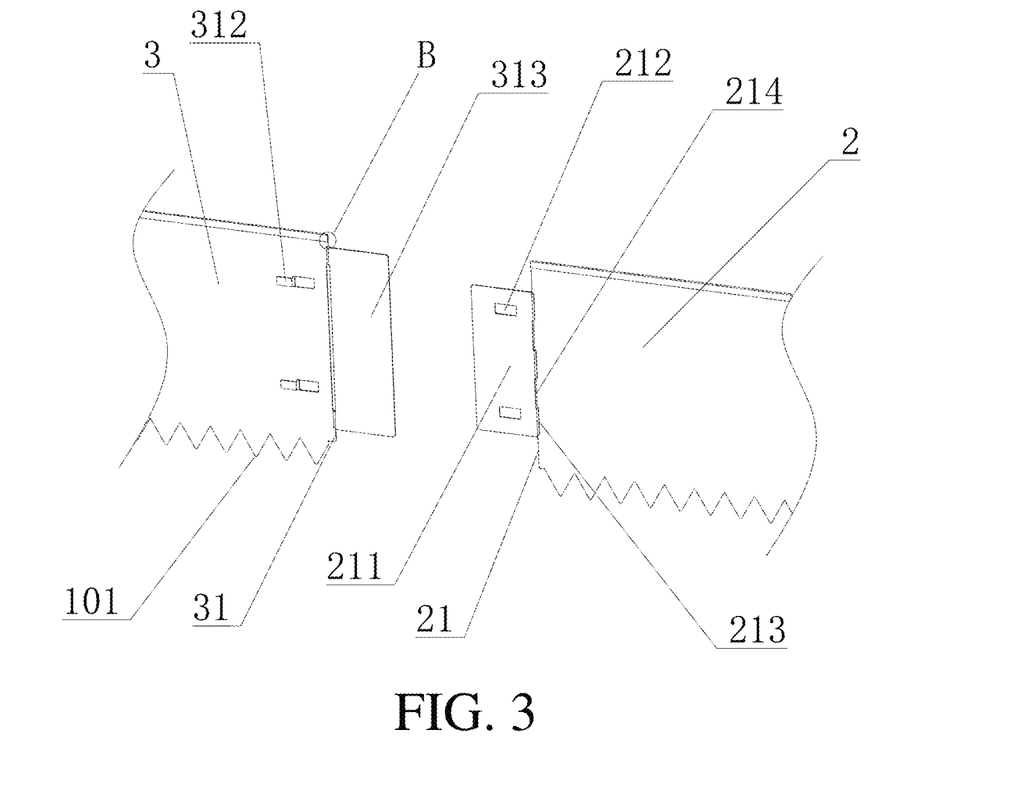
FIG. 3 is a structural diagram of the splicing mechanism of the ground-planted flower bed of this disclosure.
Figure 4:
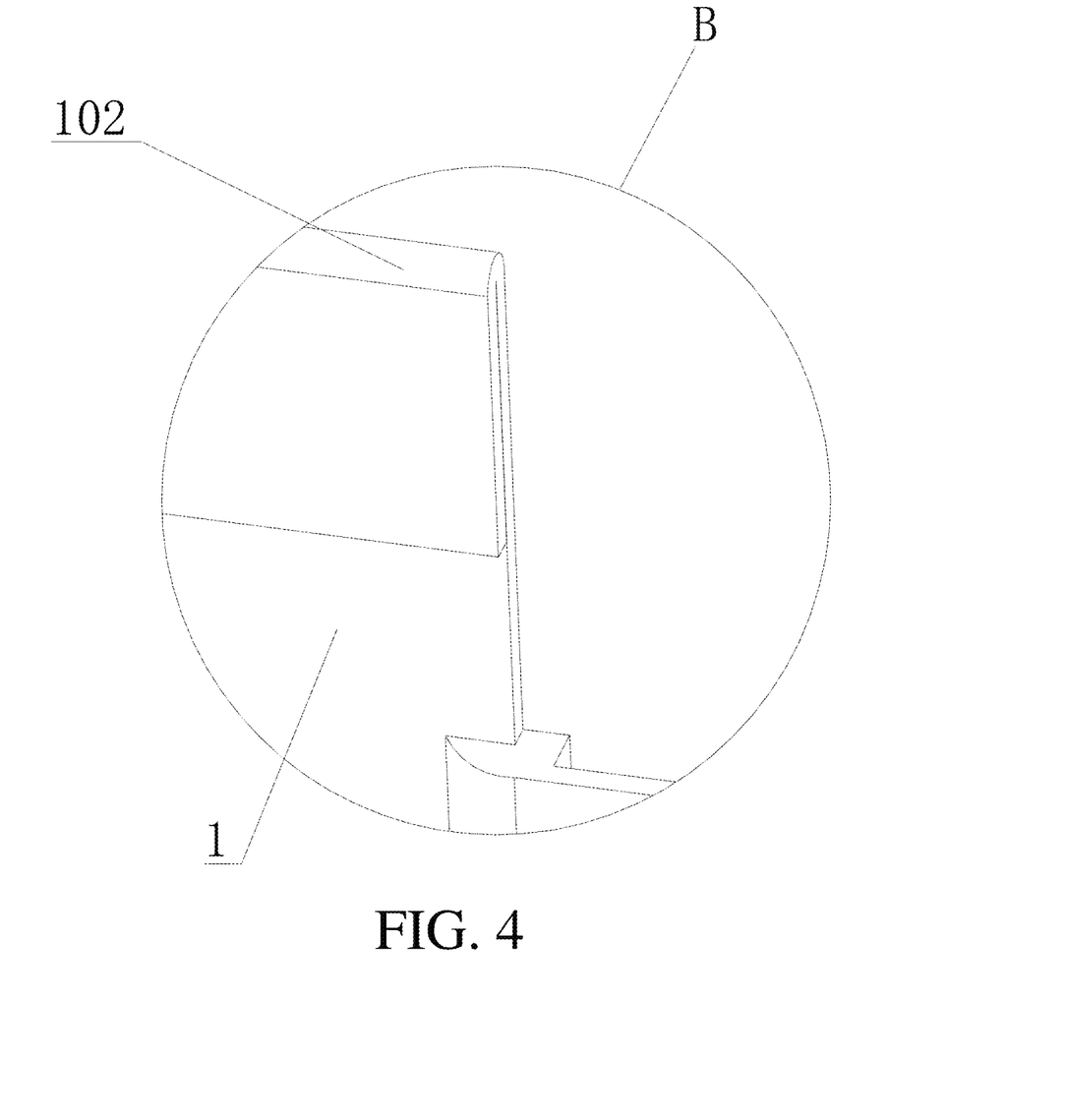
FIG. 4 is an enlarged view of part B in FIG. 3.
Figure 5:
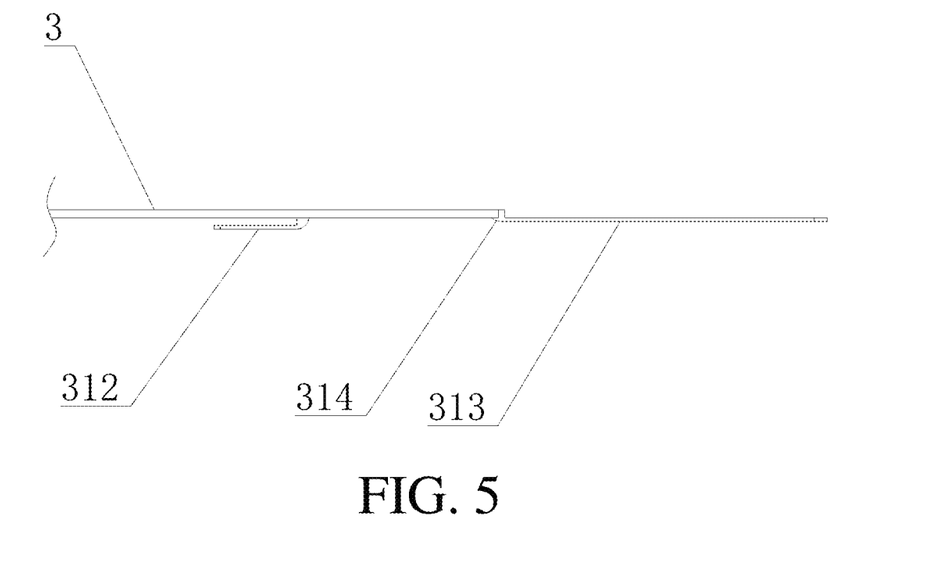
FIG. 5 is a top view of the second support plate of the ground-planted flower bed of this disclosure.

Referring to FIGS. 2-5, a connection portion 314 is integrally connected between the limiting plate 313 and the second support plate 3, the limiting plate 313 is offset to one side of the second support plate 3 through the connection portion 314; referring to FIG. 5, the limiting plate 313 and the second support plate 3 are offset, the clamping portion 312 in its folded state protrudes outward from one side of the second support plate 3, the limiting plate 313 and the clamping portion 312 in its folded state are on the same side of the second support plate 3, preventing the front end 21 of the first support plate 2 from easily displacing relative to the rear end of the second support plate after splicing, ensuring a stable structure after splicing; there are two connection portions 314 arranged vertically, with the insertion slot 311 formed between these two connection portions 314, the connection portion 314 allows for offset connection between the limiting plate 313 and the second support plate 3, while also forming the insertion slot 311, resulting in a simple structure with a rational design.

Figure 1:
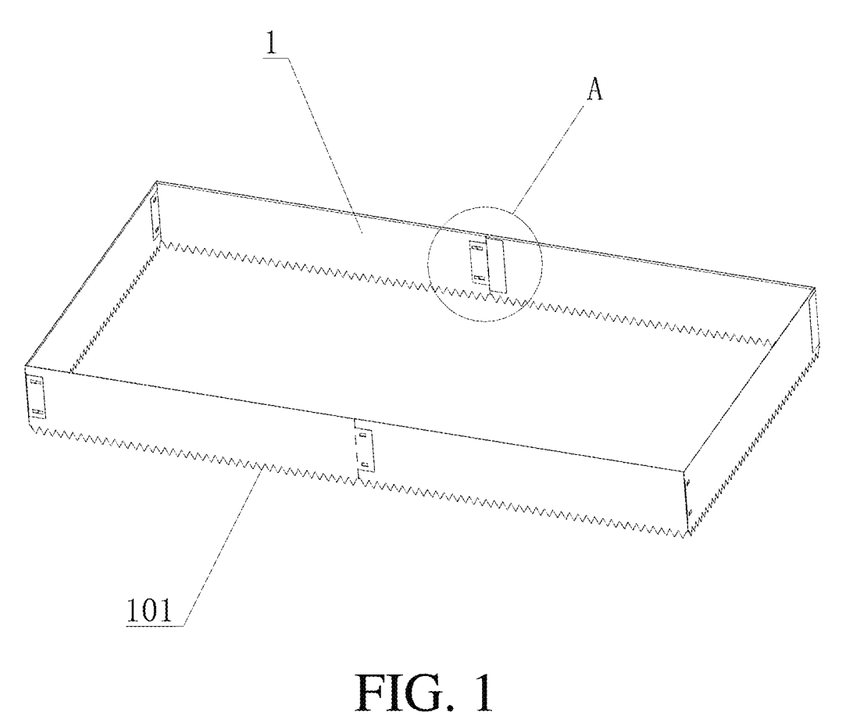
FIG. 1 is a perspective view of the ground-planted flower bed of this disclosure.
Figure 2:
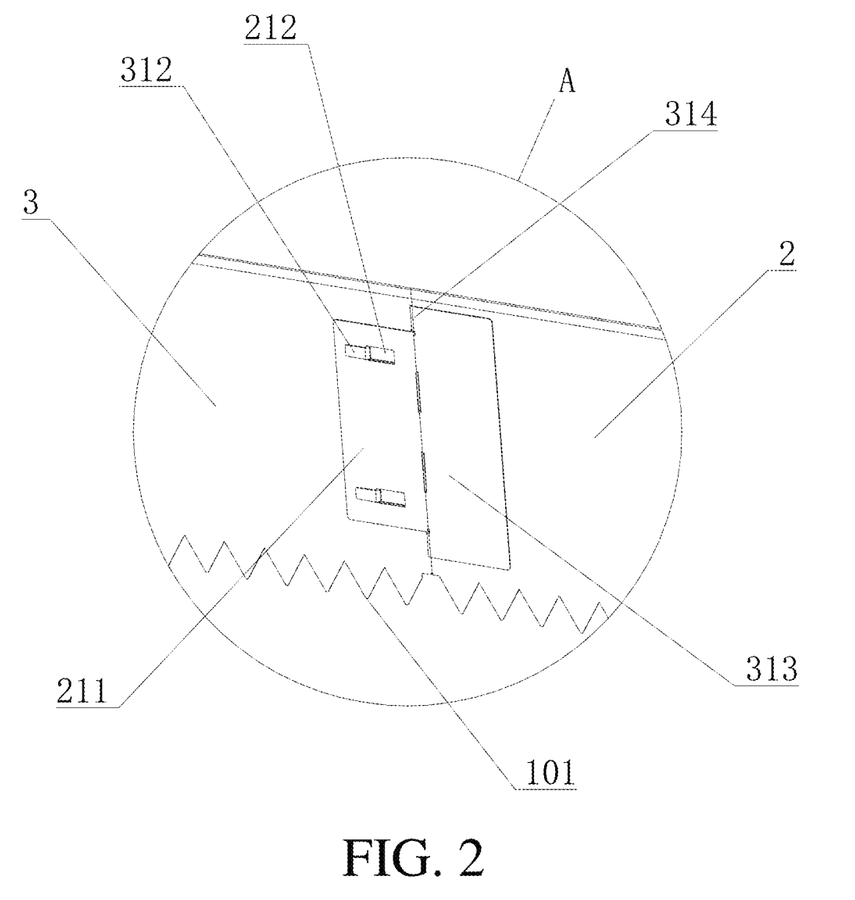
FIG. 2 is an enlarged view of part A in FIG. 1.
Figure 6:
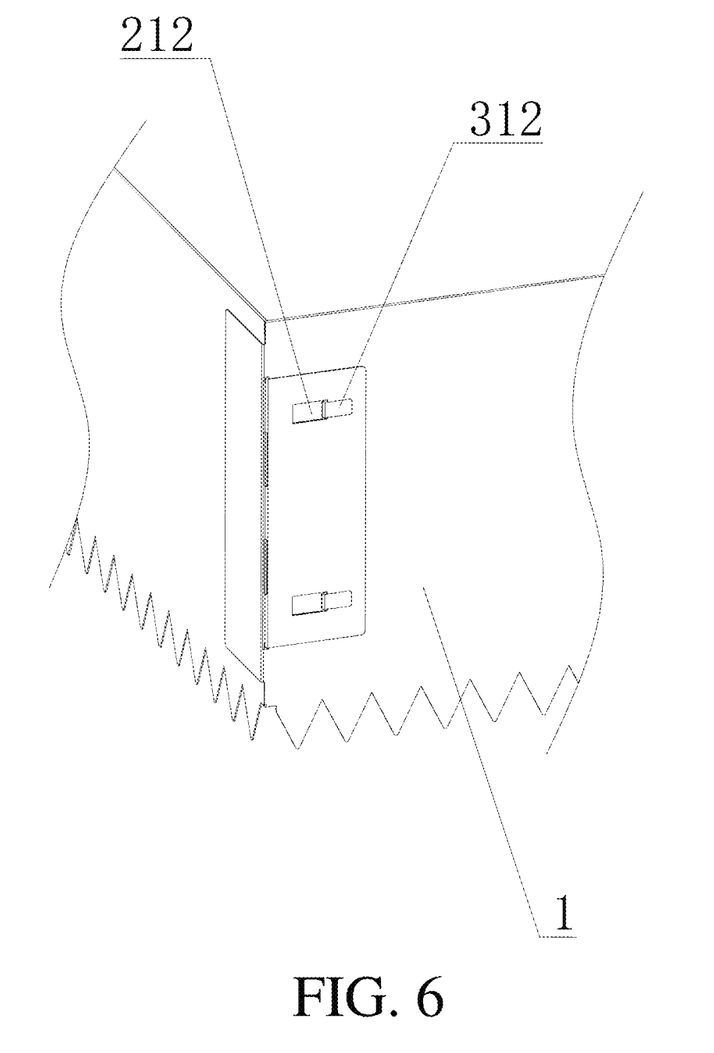
FIG. 6 is a perspective view of the corner splicing part of the ground-planted flower bed of this disclosure.

Referring to FIGS. 1, 6, and 7, the insert plate 211 is integrally connected with the first support plate 2, resulting in a simple structure and low production cost; the insert plate 211 can be bent relative to the first support plate 2, the limiting plate 313 can be bent relative to the second support plate 3, and the design of the insertion slot 311 also facilitates bending of the limiting plate 313 relative to the second support plate 3, demonstrating an ingenious structural design; a strip-shaped through slot 214 is set at the connection portion 213 between the insert plate 211 and the first support plate 2, multiple strip-shaped through slots 214 can be arranged vertically, in this embodiment, there are 2 strip-shaped through slots 214 arranged vertically; the strip-shaped through slot 214 facilitates bending the insert plate 211 at the connection portion 213, making bending convenient for achieving corner splicing between support plates.

Referring to FIGS. 1, 3, and 4, multiple pointed teeth 101 are set at the lower end of the support plate 1, with these multiple pointed teeth 101 distributed along the extension direction of the support plate 1. The pointed teeth 101 make it easy to fix the support plates on the ground, simply insert the teeth 101 into the ground when placing, preventing deformation of the support plates after fixing. A downward bending portion 102 is set on the upper part of the support plate 1, the bending portion 102 is U-shaped, making the upper part of the support plate 1 a double-layer structure through the bending portion 102, increasing the structural strength of the upper part, making the upper part of the support plate 1 less likely to deform, while also making the upper part of the support plate 1 less likely to cut the human body, ensuring high safety in use. The support plate 1 is a flexible and deformable plate body, allowing the clamping portion 312 to be bent and other operations; the support plate 1 is straight, users can splice multiple support plates of the same or different shapes according to their needs, to form a circular shape as needed by the user with various shaped support plates 1, providing good flexibility in use, wide range of applications, and good user experience. The support plate 1 is made of thin metal sheet, with low material cost and low production cost. When not spliced, the support plates are in a separate state, the metal thin sheet support plates can be stacked, taking up little space when stacked, facilitating transportation and reducing transportation costs.

Embodiment 2

Figure 8:
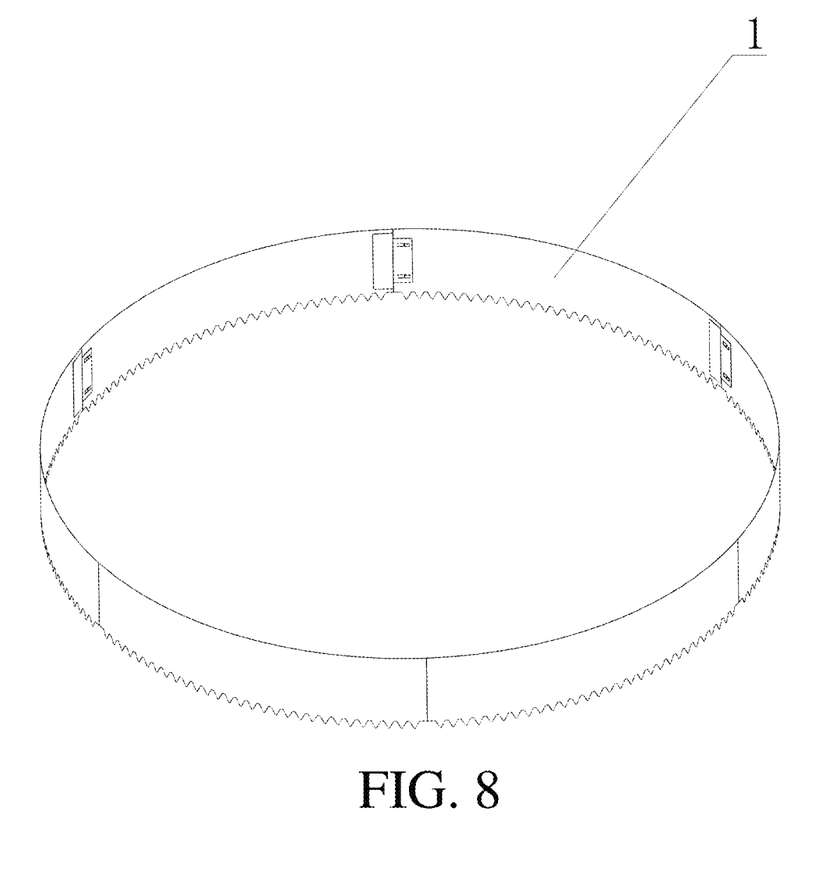
FIG. 8 is a structural diagram of the second embodiment of this disclosure.

Referring to FIG. 8, the difference between this Embodiment 2 and Embodiment 1 is: the support plate 1 is a curved plate, so that the spliced planting bed forms a circular ring shape to meet the planting needs of users.

The ground-planted flower bed in this disclosure has a simple structure and low production cost; no fasteners are needed for assembly, making assembly operation simple and assembly cost low; the structure is stable after assembly of the support plates, not prone to loosening or falling apart, providing a good user experience; the splicing mechanism is suitable for straight splicing, corner splicing, and curved support plate splicing, with a wide range of applications; when connecting the first support plate and the second support plate, first insert the insert plate into the corresponding insertion slot, then secure it by engaging the clamping portion with the slot, the structure is simple and operation is convenient; the limiting plate is placed on one side of the first support plate to limit its movement, preventing the front end of the first support plate from easily displacing relative to the rear end of the second support plate, ensuring a stable structure after splicing that is not prone to loosening; the connection portion allows for offset connection between the limiting plate and the second support plate, while also forming the insertion slot, resulting in a simple structure with a rational design; the strip-shaped through slot facilitates bending the insert plate at the connection portion, making bending convenient for achieving corner splicing between support plates; the pointed teeth make it easy to fix the support plates on the ground, simply insert the teeth into the ground when placing, preventing deformation of the support plates after fixing.

The above description is only the preferred embodiment of this disclosure. It should be pointed out that for ordinary technicians in this field, without departing from the technical principles of this disclosure, several improvements and refinements can be made, and these improvements and refinements should also be considered as within the scope of protection of this disclosure.

The invention claimed is:

1. A ground-planted flower bed, comprising:
multiple support plates (1), the multiple support plates (1) are connected end-to-end in sequence to form a circular shape,
a splicing mechanism set between adjacent support plates (1), the support plates (1) comprising adjacent first support plate (2) and second support plate (3) connected by the splicing mechanism, wherein an end of the first support plate (2) facing the second support plate (3) is a front end (21), and an end of the second support plate (3) facing the first support plate (2) is a rear end (31), the splicing mechanism comprising:
an insert plate (211) set on the front end (21),
a corresponding insertion slot (311) set on the rear end (31) for receiving the insert plate (211),
a slot (212) set on the insert plate (211),
a clamping portion (312) corresponding to the slot (212) set on the second support plate (3), the clamping portion (312) being configurable into an unfolded state having a straight configuration, and a folded state having a bent configuration that protrudes outward from one side of the second support plate (3), and
a limiting plate (313) integrally formed on the rear end (31) of the second support plate (3), the limiting plate (313) being offset to the same side of the second support plate (3).

2. The ground-planted flower bed according to claim 1, wherein
the clamping portion (312) is a bendable clamping strip integrally formed with the second support plate (3), before the first support plate (2) and the second support plate (3) are connected, the clamping portion (312) is in the unfolded state;
wherein the insert plate (211) is configured to be inserted into the insertion slot (311), the unfolded clamping portion (312) is configured for alignment with the slot (212), and the unfolded clamping portion (312) is configured for bending into the folded state, so that the folded clamping portion (312) engages with the corresponding slot (212).

3. The ground-planted flower bed according to claim 2, wherein
the insertion slot (311) is formed between the second support plate (3) and the limiting plate (313), when the insert plate (211) is inserted into the insertion slot (311), the limiting plate (313) is placed on one side of the first support plate (2).

4. The ground-planted flower bed according to claim 3, wherein
at least one connection portion (314) is integrally connected between the limiting plate (313) and the second support plate (3), and the limiting plate (313) is offset to the same side of the second support plate (3) through the at least one connection portion (314).

5. The ground-planted flower bed according to claim 4, wherein there are two connection portions (314) arranged vertically, with the insertion slot (311) formed between the two connection portions (314).

6. The ground-planted flower bed according to claim 3, wherein the insert plate (211) is integrally connected with the first support plate (2), the insert plate (211) being bendable relative to the first support plate (2), and the limiting plate (313) being bendable relative to the second support plate (3), wherein a strip-shaped through slot (214) is set at a connection portion (213) between the insert plate (211) and the first support plate (2), which facilitates bending the insert plate (211) at the connection portion (213).

7. The ground-planted flower bed according to claim 1, wherein multiple pointed teeth (101) are set at a lower end of the support plates (1), with the multiple pointed teeth (101) distributed along an extension direction of the support plates (1).

8. The ground-planted flower bed according to claim 1, wherein a bending portion (102) is set on an upper part of the support plates (1).

9. The ground-planted flower bed according to claim 1, wherein each of the support plates (1) is a flexible and deformable plate body, which is straight or curved.

10. The ground-planted flower bed according to claim 9, wherein each of the support plates (1) is made of a thin metal sheet.

11. The ground-planted flower bed according to claim 2, wherein each of the support plates (1) is a flexible and deformable plate body, which is straight or curved.

12. The ground-planted flower bed according to claim 3, wherein each of the support plates (1) is a flexible and deformable plate body, which is straight or curved.

13. The ground-planted flower bed according to claim 4, wherein each of the support plates (1) is a flexible and deformable plate body, which is straight or curved.

14. The ground-planted flower bed according to claim 5, wherein each of the support plates (1) is a flexible and deformable plate body, which is straight or curved.

15. The ground-planted flower bed according to claim 6, wherein each of the support plates (1) is a flexible and deformable plate body, which is straight or curved.

16. The ground-planted flower bed according to claim 7, wherein each of the support plates (1) is a flexible and deformable plate body, which is straight or curved.

17. The ground-planted flower bed according to claim 8, wherein each of the support plates (1) is a flexible and deformable plate body, which is straight or curved.

\* \* \* \* \*